United States Patent Office 2,732,298
Patented Jan. 24, 1956

2,732,298

METHOD OF PRODUCING A PHOTOGRAPH ON GLASS

Stanley Donald Stookey, Corning, N. Y., assignor to Corning Glass Works, Corning, N. Y., a corporation of New York No Drawing. Application December 5, 1952, Serial No. 324,415

16 Claims. (Cl. 95—5.5)

This invention relates to the production in glass and in glazes of permanent two-dimensional photographic images suitable for use as reticles and scales, micro-photographic records, projection slides, portraits, decorations and the like.

The photographic media which are presently available for recording such images comprise conventional photosensitive emulsions supported on cellulosic sheets or glass plates, and photosensitive glasses.

As is well known, conventional photographic procedure involves the use of an emulsion of a photosensitive silver halide in gelatin, collodion or other organic plastic material in which a latent image is formed by selective exposure to actinic radiations and developed by chemical reduction of the exposed silver halide to metallic silver to form a visible image which is fixed by dissolving and removing the unexposed silver halide from the emulsion. For the purpose of reversing or retoning such an image, the silver therein is sometimes converted to a silver compound such as the bromide or the sulfide. Such an image, while substantially two-dimensional, is not permanent and is easily damaged by abrasion unless the emulsion containing it is enclosed between glass plates. Even when so protected it may be damaged by the penetration of liquids between the plates or destroyed by heat.

A permanent image may be produced in a photosensitive glass containing gold, silver or copper as a photosensitizing metal by selective exposure of such a glass to short-wave radiations (shorter than 400 millimicrons) to form a latent image therein followed by heating the glass to develop such image as is shown in United States Patents Nos. 2,515,936, 2,515,937, and 2,515,938. An image so produced may be three-dimensional and extend partly or entirely through the glass but, with a sufficiently short exposure, the image may be confined so near the surface of the glass as to be substantially two-dimensional. However a two-dimensional image made in such manner is relatively faint and is barely visible because its color saturation or color density, particularly in a glass in which the photosensitizing metal is silver, is very low.

I have now discovered that an unusually satisfactory permanent, two-dimensional photographic image can be produced in glass without resort to any specific photosensitive or other type of glass provided that the glass is a silicate glass containing an alkali metal oxide. In accordance with my invention, there is first formed on the surface of such a silicate glass by conventional procedure a chemically fixed, photographic image composed of colloidal silver or a compound of silver and the glass together with the image is then heated either in air alone or with an additional oxidizing agent or medium present at a temperature between about 125° C. below the strain point of the glass and just below its softening point for a time sufficient to oxidize and ionize the silver and to cause migration of silver ions into the glass in exchange for alkali metal ions therein. (As used herein, strain point means that temperature at which the viscosity of the glass is $10^{14.6}$ poises and softening point is that temperature at which the viscosity is $10^{7.6}$ poises.) Any organic matter which may be present with the colloidal silver image on the glass is oxidized and eliminated during the heating step before oxidation and ionization of the silver take place. While the minimum and maximum temperatures at which the reactions can occur vary with the strain point and the softening point respectively of the glass, the practicable temperatures will not be less than about 400° C. nor more than about 650° C.

The migrated silver changes the refractive index of the glass sufficiently to produce a visible image which is usually of a yellowish to brownish color due to spontaneous conversion or reduction of a small portion of the silver ions in the glass to metallic particles. If desired, more or less complete reduction and intensification of the color to dark amber or brown can be accomplished by subsequently heating the glass in a reducing medium or atmosphere containing a reducing gas such as hydrogen, carbon monoxide or methane. Advantageously this may comprise continuing the heating within the same temperature range after the migration of the silver ions into the glass has taken place and displacing the atmospheric air with the reducing gas.

The migration of silver into the glass takes place in accordance with the reaction known as ion exchange and it requires the presence in the glass of a substantial amount of an alkali metal oxide to provide exchangeable ions. The general composition of a suitable glass however is not otherwise critical and any practicable silicate glass or glaze, the composition of which contains substantial silica and an alkali metal oxide, may be utilized for carrying out the invention. Advantageously glasses of the soda-lime-silicate type such as those described in United States Patent No. 1,369,988 or of the low-expansion borosilicate type such as those described in United States Patent No. 1,304,623 may be employed.

In glasses of the borosilicate type, and particularly the aforementioned low-expansion borosilicate glasses, maximum conversion or reduction of the silver ions in the glass to metallic particles, for reasons not known, occurs spontaneously during the ion exchange and the full color of the image in the glass is thereupon developed. This characteristic effect of borosilicate glasses is independent of the presence or absence of a reducing agent.

For viewing by reflected light, the image in the glass may be provided with a white opaque background by employing an opal glass such as those described in United States Patent No. 2,224,469. Instead of being white the background may be colored by the addition of known coloring agents to the glass batch before it is melted. Any glass, either clear or opaque, which contains a substantial amount of PbO, however, is not particularly desirable because when such a glass is heated in a reducing atmosphere its surface turns black due to reduction of PbO to metallic lead which tends to obscure the image. Glazes and enamels are low-melting glasses and are included in the term "glass" as used herein.

The present process is entirely independent of any photo-sensitivity of the glass and, while it is advantageously carried out with non-photosensitive glasses, it is also applicable to glasses which are photosensitive such as the glasses described in the above-mentioned United States Patents Nos. 2,515,936, 2,515,937 and 2,515,938.

For forming a colloidal silver image on the surface of the glass a photosensitive solution or emulsion is applied preferably directly to the glass before the formation of the image therein; but if desired, the image may first be formed in an emulsion film of the type known as "stripping film" which is subsequently transferred to the glass. Emulsions of excessive thickness tend to crack and curl during the burning off of the organic matter, thereby impairing the close contact of the colloidal silver image with the glass. It is advantageous to harden the emulsion with formaldehyde or other hardener in known manner before heating to burn off the organic matter.

Following the elimination of organic matter, heating is continued at a temperature high enough to cause the exchange of silver ions for alkali metal ions in the glass. Such exchange may be accomplished in from one to six hours at temperatures having a minimum about 125° C. below the strain point of the glass. The reaction is more rapid at higher temperatures and requires only one to five minutes at the maximum teperature which should be sufficiently below the softening point of the glass to avoid distortion thereof.

In order to facilitate the exchange of ions it is advantageous to cover the colloidal silver image on the glass with a coating of an argillaceous material prior to heating it although exchange can take place without such coating. If the silver image is in an organic medium, the coating may be applied after the organic material has been burned off, but it is preferable to apply it before the elimination of the organic material thereby protecting the colloidal silver image and further minimizing any tendency for it to become separated from the glass during the initial heating.

Although clays and clay-containing materials in general are at least to some extent effective, ocher is particularly effective and is preferred for my purpose. The argillaceous material, which is more effective is finely divided, is mixed preferably with water to form a paste or a slurry. Other vehicles such as volatile organic liquids and oils may be used instead of water. The coating is applied to the glass with a brush or by dipping or spraying and is dried in place slowly enough to avoid bubbling of the vehicle. It is believed that the argillaceous material facilitates the ion exchange by combining with the evolved alkali metal ions thus removing them from the zone of reaction.

In lieu of an argillaceous coating over the colloidal silver image the presence of up to about 25% by volume of $SO_2$ in the air in contact with the glass and the image while they are being heated to cause oxidation and migration of silver into the glass facilitates or increases the ion exchange; larger proportions of $SO_2$ in the air prevent such oxidation and migration of the silver. This effect of $SO_2$ is independent of and takes place either in the presence or absence of the argillaceous coating.

The elimination of organic matter and the rate and amount of the migration of the silver into the glass can be substantially further increased by the presence in the reaction zone of one or more of the salts, ferric sulfate, ferrous sulfate or aluminum sulfate either alone or, as is preferable, in admixture with the argillaceous material. It is believed that such sulfates are readily decomposed at the temperatures employed and that the liberated oxygen accelerates the elimination of the organic material and the ionization of the silver. In any event the presence of such salt or salts in the reaction zone results in a more rapid elimination of the organic matter and a substantial increase in the rate and amount of the migration of the silver into the glass, such migration occurring at a lower tmeperature and in a shorter time than when the sulfate is absent. For instance if the glass is heated in air at a minimum temperature of 50° C. below the strain point of the glass and in the absence of such sulfate, about six hours is required to ionize the silver and cause its migration into the glass; but the presence of one of the above-mentioned sulfates in the reaction zone causes the same result at a minimum temperature of 125° C. below the strain point of the glass and with only one hour of heating.

Maximum reduction of the migrated silver ions and the fullest development of the color of the silver in the glass may also be accomplished during the ion exchange, regardless of whether or not the glass is a borosilicate, by incorporating in the argillaceous material before applying it to the glass a cuprous compound or a mixture which on heating will produce a cuprous compound such as $Cu_2S$, $CuS+S$, $Cu_2Cl_2$, or $Cu_2O$. For example the following compositions in which the constituents are given in grams and the vehicle in cubic centimeters may be utilized:

|  |  | A | B | C |
|---|---|---|---|---|
| Ocher | g | 150 | 300 |  |
| Bentonite | g |  |  | 1 |
| $BaCO_3$ | g |  |  | 24 |
| CuS | g | 660 | 1,320 | 60 |
| S | g | 190 | 500 | 15 |
| Turpentine | cc | 1,000 |  |  |
| Oil of Lavender | cc |  | 1,000 |  |
| Water | cc |  |  | 100-200 |

The application of such a composition as a coating on the glass prior to heating results not only in an increased migration of silver ions due to the presence of the argillaceous material, but also causes a uniform migration of some of the cuprous ions into the glass. During such reaction the silver ions in the glass are reduced by the cuprous ions which migrate into their vicinity and the full color of the silver image in the glass is thus developed without the necessity of a subsequent heating in a reducing atmosphere. Cuprous ions which migrate into the glass but not into the vicinity of the silver image remain colorless in nonborosilicate glasses and do not produce any color in such glasses in the absence of subsequent heating in a reducing atmosphere. In a borosilicate glass the cuprous ions spontaneously develop a yellow color and the entire area of the glass containing them is thus colored. Therefore, if such overall coloration is undesirable, the use of cuprous compounds for reducing the silver ions should be avoided in treating borosilicate glasses.

The concentration of the silver in the image prior to its migration into the glass varies of course according to the high lights and the low lights of the image. The silver ions migrate into the glass in proportion to their concentration in the image. Therefore the original image is substantially exactly reproduced within the glass in shades of amber or brown which vary so as to reproduce the high lights and low lights of the image. Since the silver ions normally migrate into the glass a distance of only a few microns, the final image therein is substantially two-dimensional. If the original image is a positive image, the final image in the glass will also be a positive image.

*Example 1*

A photographic dry plate of the type known as "Eastman S-1 spectrographic plate" comprising a glass plate of a soda-lime-silicate glass having approximately a softening point of 720° C. and a strain point of 490° C. and coated with a light-sensitive emulsion of a silver halide was provided by conventional photographic procedure with a positive image of a portrait. A paste of ocher and water was applied over the emulsion bearing the image and the plate was heated with sufficient slowness so that one hour was required for its temperature to reach 525° C. Heating at this temperature in air was continued for 30 minutes after which the atmosphere in the heating kiln was displaced by a mixture of 8% hydrogen and 92% nitrogen and heating was continued for 30 more minutes. Thereafter the plate was cooled and all residual material was removed from its surface. The portrait in yellow and brown remained within the surface of the glass.

*Example 2*

A positive image of a line drawing was reproduced by conventional procedure in a stripping film known as "Kodalith" and the stripped portion was transferred to a plate of a borosilicate glass having a softening point of 820° C. and a strain point of 515° C. so that the emulsion containing the image was in contact with the glass. Not only was the colloidal silver image thus brought closer to the glass but the image was thereby inverted. The plastic supporting membrane of the film was dissolved away with acetone, leaving the silver image in a gelatin coating on the glass. A paste of ocher and water was applied over the gelatin and the plate was then heated to 620° C. in air and this temperature was maintained for 30 minutes. After the plate was cooled and cleaned the original image appeared in a reversed position within the surface of the glass in a dark amber color.

*Example 3*

A positive photographic image of a line drawing was formed by conventional procedure in a sheet of the stripping film referred to in Example 2 and was applied to a sheet of window glass having approximately a softening point of 720° C. and a strain point of 490° C. A paste composed of 25% of ferric sulfate and 75% of ocher mixed with water was applied as a coating over the film and when dry the coated sheet was heated at 450° C. for 30 minutes. After the removal of the residue from the glass sheet it was again heated at 450° C. for 15 minutes in an atmosphere of hydrogen. The resulting image in the glass was positive and the lines were so densely colored as to appear substantially black.

Such use of stripping film has the advantage that the heating may be as rapid as the glass will withstand without undesirably impairing the close contact of the colloidal silver image with the glass.

*Example 4*

A graduated or step exposure, sometimes referred to as a "circular projection print scale," was printed and developed on a photographic plate of the type referred to in Example 1 and the plate was heated at 525° C. for 20 minutes to burn off organic material and leave on the glass the silver image of the scale. The plate was then coated with the above-mentioned composition B and after gradual heating to evaporate the vehicle the coated plate was heated to 550° C. where it was held for 10 minutes and then cooled. When the residual coating had been removed from the glass the scale appeared as a permanent image in the glass surface in colors varying from yellow through brown to dark brown with increasing exposure.

The term "silicate glass" as used herein means a glass prepared by fusion of raw glass-making materials containing on the oxide basis a major proportion of silica and a minor proportion of an alkali metal oxide such as sodium oxide or potassium oxide or lithium oxide, preferably containing a minor proportion of an oxide of a metal of the second periodic group up to and including barium or a plurality of such oxides, and optionally containing a minor proportion of another conventional glass-forming oxide such as alumina but being substantially free of lead oxide.

The term "borosilicate glass" as used herein means a glass prepared by fusion of raw glass-making materials containing on the oxide basis a major proportion of silica, a minor proportion of boric oxide and a minor proportion of an alkali metal oxide such as sodium oxide or potassium oxide or lithium oxide, and optionally containing a minor proportion of another conventional glass-forming oxide such as alumina or an oxide of a metal of the second periodic group up to and including barium or a plurality of such oxides but being substantially free of lead oxide. As will be evident, the term "silicate glass" includes the term "borosilicate glass" within its meaning.

What is claimed is:

1. The method of producing a permanent two-dimensional photographic image within the surface of a silicate glass containing an alkali metal oxide, which comprises forming on such surface a chemically fixed, photographic image comprising silver, and heating the glass together with the image in the presence of air containing up to 25% by volume of $SO_2$ at a temperature between about 125° C. below the strain point of the glass and just below its softening point for a time sufficient to oxidize and ionize the silver and to cause migration of silver ions into the glass.

2. The method of claim 1 in which the glass is a borosilicate glass.

3. The method of producing a permanent two-dimensional photographic image within the surface of a silicate glass containing an alkali metal oxide, which comprises forming on such surface a chemically fixed, photographic image comprising silver, heating the glass together with the image in the presence of an oxidizing medium at a temperature between about 125° C. below the strain point of the glass and just below its softening point for a time sufficient to oxidize and ionize the silver and to cause migration of silver ions into the glass, and reducing the migrated silver ions to metallic particles while heating the glass in said temperature range in the presence of a reducing medium.

4. The method of claim 3 in which the oxidizing medium is air.

5. The method of producing a permanent two-dimensional photographic image within the surface of a silicate glass containing an alkali metal oxide, which comprises forming on such surface a chemically fixed, photographic image comprising silver, heating the glass together with the image in the presence of an oxidizing medium at a temperature between about 125° C. below the strain point of the glass and just below its softening point for a time sufficient to oxidize and ionize the silver and to cause migration of silver ions into the glass, and heating the blass in said temperature range in a reducing atmosphere containing a reducing gas selected from the class consisting of hydrogen, carbon monoxide, and methane to convert the migrated silver ions to metallic particles.

6. The method of claim 5 in which the reducing gas is composed of 8% hydrogen and 92% nitrogen.

7. The method of producing a permanent two-dimensional photographic image within the surface of a silicate glass containing an alkali metal oxide, which comprises forming on such surface a chemically fixed, photographic image comprising silver, applying over such image a coating comprising an argillaceous material, and heating the coated glass in the presence of an oxidizing medium at a temperature between about 125° C. below the strain point of the glass and just below its softening point for a time sufficient to oxidize and ionize the silver and to cause migration of silver ions into the glass.

8. The method of producing a permanent two-dimensional photographic image within the surface of a silicate glass containing an alkali metal oxide, which comprises forming on such surface a chemically fixed, photographic image comprising silver, applying over such image a coating comprising an argillaceous material, and heating the coated glass in the presence of an oxidizing medium at a temperature between about 125° C. below the strain point of the glass and just below its softening point for a time sufficient to oxidize and ionize the silver and to cause migration of silver ions into the glass, and reducing the migrated silver ions to metallic particles while heating the glass in said temperature range in the presence of a reducing medium.

9. The method of claim 7 in which the glass is a borosilicate glass.

10. The method of claim 7 in which the argillaceous coating contains ocher.

11. The method of claim 7 in which the argillaceous coating contains a copper compound selected from the group consisting of $Cu_2S$, $CuS+S$, $Cu_2Cl_2$, and $Cu_2O$.

12. The method of producing a permanent two-dimensional photographic image within the surface of a silicate glass containing an alkali metal oxide, which comprises forming on such surface a chemically fixed, photographic image comprising silver, applying over such image a coating comprising a sulfate selected from the group consisting of ferric sulfate, ferrous sulfate and aluminum sulfate, and heating the coated glass for a time and at a temperature ranging from about 1 hour at 125° C. below its strain point to between 1 and 5 minutes at a temperature sufficiently below its softening point to avoid deformation of the glass to oxidize the silver and to cause migration of silver ions into the glass.

13. The method of claim 12 in which the sulfate is ferric sulfate.

14. The method of producing a permanent two-dimensional photographic image within the surface of a silicate glass containing an alkali metal oxide, which comprises forming on such surface a chemically fixed, photographic image comprising silver, applying over such image a coating comprising a sulfate selected from the group consisting of ferric sulfate, ferrous sulfate and aluminum sulfate, and heating the coated glass for a time and at a temperature ranging from about 1 hour at 125° C. below its strain point to between 1 and 5 minutes at a temperature sufficiently below its softening point to avoid deformation of the glass to oxidize the silver and to cause migration of silver ions into the glass, and reducing the migrated silver ions to metallic articles while heating the glass in said temperature range in the presence of a reducing medium.

15. The method of claim 12 in which the glass is a borosilicate glass.

16. The method of producing a permanent two-dimensional photographic image within the surface of a silicate glass containing an alkali metal oxide, which comprises forming on such surface a chemically fixed, photographic image comprising silver, applying over such image a coating comprising an argillaceous material and a sulfate selected from the group consisting of ferric sulfate, ferrous sulfate and aluminum sulfate, and heating the coated glass for a time and at a temperature ranging from about 1 hour at 125° C. below its strain point to between 1 and 5 minutes at a temperature sufficiently below its softening point to avoid deformation of the glass to oxidize the silver and to cause migration of silver ions into the glass.

References Cited in the file of this patent

UNITED STATES PATENTS

| | | |
|---|---|---|
| 112,703 | Goodes | Mar. 14, 1871 |
| 719,197 | Crabtree | Jan. 27, 1903 |
| 2,472,128 | Staehle | June 7, 1949 |
| 2,515,275 | Stookey | July 18, 1950 |
| 2,515,936 | Armistead | July 18, 1950 |